United States Patent Office 2,945,839
Patented July 19, 1960

2,945,839

REACTIVE GROUP CONTAINING STYRENE HOMOPOLYMERS

Joseph A. Blanchette, East Longmeadow, Mass., assignor to Monsanto Chemical Company, St. Louis, Mo., a corporation of Delaware No Drawing. Filed May 22, 1957, Ser. No. 660,747

6 Claims. (Cl. 260—63)

This invention relates to new polystyrene derivatives containing reactive groups and particularly to styrene homopolymers containing ring-substituted acetyl and carboxyl groups.

Polystyrenes have found wide application in the plastics industry because of the broad range of properties available in the several homologues. More recently, the ring-substitution of such polymers with reactive groups has greatly expanded the range of properties available, thus opening new and important vistas of application.

Therefore, it is an object of this invention to provide new polystyrene derivatives containing aryl-substituted reactive groups.

Another object is to provide new polystyrene derivatives containing both acetyl and carboxyl groups.

Another object is to provide a process for preparing polystyrene derivatives containing both acetyl and carboxyl groups.

These and other objects are attained by oxidizing a portion of the acetyl groups of an aryl-acetylated styrene homopolymer to form styrene homopolymers containing both acetyl and carboxyl groups substituted upon the aromatic rings thereof.

The following examples are given in illustration of the invention and are not intended as limitations thereon. Where parts are mentioned, they are parts by weight.

*Example I*

Fifteen parts (about 0.1 mol upon monomeric basis) of p-acetylpolystyrene containing an average of one acetyl group for every aromatic ring thereof are added to 140 ml. of an aqueous sodium hypochlorite solution containing 12% of available chlorine on a gms. per 100 ml. basis, of which, by definition, only one-half is active chlorine. The slurry is refluxed at atmospheric pressure with stirring until the solid p-acetylpolystyrene is substantially dissolved and the evolution of chloroform formed in the reaction ceases. Insoluble impurities are filtered from the solution and the filtrate is cautiously neutralized with hydrochloric acid, avoiding excessive foaming. The white precipitated sodium salt of the p-carboxylated and acetylated polystyrene is removed by filtration. Infrared analysis of the product shows that approximately 80% of the acetyl groups have been converted to carboxyl groups and that none of the aromatic rings have been oxidized.

*Example II*

Fifteen parts (about 0.1 mol upon monomeric basis) of a 2-acetyl-4-methyl-polystyrene containing substantially 1 acetyl group per aromatic ring on approximately 50% of the aromatic rings thereof are dissolved in 100 ml. of tetrahydrofuran. Thirty-five ml. of an aqueous sodium hypochlorite solution containing 12% available chlorine, as in Example I, are added. The slurry is refluxed at atmospheric pressure until the evolution of chloroform formed in the reaction ceases. Most of the tetrahydrofuran is removed by distillation to precipitate the sodium salt of 2 - carboxylated and acetylated - 4 - methyl polystyrene. Approximately 50% of the acetyl groups have been converted to carboxyl groups to yield a p-methyl polystyrene containing ortho-substituted acetyl groups on about 25% of the aromatic rings thereof and ortho-substituted carboxyl groups on about another 25% of the aromatic rings thereof.

The aryl-acetylated polystyrenes which are oxidized to form the compositions of this invention are the homopolymeric derivatives of styrene compounds selected from the group consisting of styrene, divinyl benzene, alpha-methyl styrene, and aryl mono- and di-substituted derivatives thereof wherein said aryl substituent may be hydroxyl, chloro, or nitro radicals or aliphatic hydrocarbon radicals containing 1–4 carbon atoms such as methyl, ethyl, butyl, etc., styrenes, or ar-methyl-alpha-methyl styrenes, etc. Aryl-acetylation of such homopolymers may be accomplished in many ways; e.g., a styrene homopolymer may be reacted with acetic anhydride or acetyl halide in a suitable solvent medium, such as tetrahydrofuran, and in the presence of a Friedel-Crafts catalyst. The styrene homopolymers, before acetylation, have Staudinger molecular weights ranging from about 10,000 to 60,000. The degree of acetylation may be controlled to yield aryl-acetylated polystyrene containing an overall average of 0.1 to 2 acetyl groups per aromatic ring. In a preferred embodiment of this invention aryl-acetylated polystyrenes are used in which 50–100% of the aromatic rings thereof contain at least 1 acetyl group.

The positioning of the acetyl groups upon the aromatic ring depends upon the particular styrene homopolymer that has been acetylated. The ethylene group of polystyrene is strongly directive to the para- and weakly directive to the ortho-position. Therefore, the aryl-acetylated derivatives of homopolymers of styrene or alpha-methyl styrene consist essentially of p-acetyl polystyrenes. However, the acetyl group positioning obtained using homopolymers of any of the aryl-substituted styrene compounds is, of course, dependent upon the ring positioning of such aryl-substituents and their directivity acting to either reinforce or negate the directivity of the vinyl group.

The products of this invention are the partially carboxylated derivatives of acetylated polystyrenes prepared by the oxidation of a portion of the acetyl groups thereof under such conditions that neither the aromatic rings nor the backbone of the polymer are attacked. As used herein, the term "backbone of the polymer" refers to the vinyl linkages forming the polymeric chain which when pictured as structural formulae resemble a backbone with aryl-ribs attached thereto. The number of carboxyl and acetyl groups in the final styrene homopolymer may be varied through control, first, of the degree of acetylation of the styrene homopolymer, and second, of the degree of oxidation of said acetyl groups. Polystyrene homopolymers wherein 50–100% of the aromatic rings thereof are acetylated and 10–95% of said acetyl groups are subsequently oxidized to carboxyl groups form the preferred embodiment of this invention.

Oxidation reactions are typically exothermic and the heat released, unless controlled, soon raises the temperature of the reaction system to the boiling point of the liquids employed. Since the rate of oxidation is dependent in part upon the temperature of the system, the rate also increases rapidly with increasing temperature. Many oxidizing agents, and methods for their use, are available and may be used for the preparation of the homopolymers of this invention. However, with most of these, rigid control of both reaction rate and temperature are required to avoid oxidation of the aromatic ring or splitting of the backbone of the polymeric chain. It is preferred to use, as oxidizing agent, an aqueous solution of a soluble alkali metal hypohalite, e.g., sodium hypochlorite, potassium hypobromite, etc. These compounds selectively oxidize only the acetyl groups and do not attack either the aromatic rings or the backbone of the polymer, even in uncontrolled reactions. The oxidation reaction may be effected at room temperature, but since the rate of reaction increases with increasing temperature, it is preferred to permit the exothermic nature of the reaction to raise the reaction system to reflux temperature. The reaction may be accomplished either in a non-reactive organic liquid which is a solvent for both the aryl-acetylated polystyrene and the aqueous alkali metal hypohalite solution, e.g., tetrahydrofuran, chloroform, dimethyl formamide, etc., or alternatively by maintaining the solid aryl-acetylated polystyrene in suspension in the aqueous alkali metal hypohalite solution as in Example I. The degree of oxidation of the aryl-acetylated polystyrene may be controlled either by adjusting the stoichiometric proportions of active halide in the alkali metal hypohalite to acetyl groups, or stopping the reaction short of completion according to a predetermined temperature-rate-time schedule.

Compositions containing the aryl-acetylated-carboxylated-polystyrenes of this invention may be modified by the incorporation of conventional additives such as dyes, pigments, fillers, extenders, etc. The polymers may be used alone or in co-mixture with other polymeric materials, e.g., with other vinylidene polymers.

The aryl-acetylated-carboxylated polystyrenes of this invention exhibit desirable anti-static properties and are substantially more stable to light than are the parent styrene homopolymers from which they are derived. In addition, those polymers wherein at least 50% of the aromatic rings contain carboxyl groups in the form of sodium or ammonium salts are soluble in methanol, ethanol, and water, and are therefore useful as surfactants and/or dispersing agents. Control of both the degree of acetylation and the degree of carboxylation of said acetyl groups within the prescribed limits as herein set forth, provides many new polystyrene compositions combining the special properties of these acetyl and carboxyl groups while retaining some measure of the desirable properties of the parent styrene homopolymer from which they are derived. Furthermore, the presence of both acetyl and carboxyl reactive groups makes these compositions useful as precursors for further chemically modified polymers. For example, they may be reacted with polyhydric alcohols to form alkyd type resins.

It is obvious that many variations may be made in the products and processes set forth above without departing from the spirit and scope of this invention.

What is claimed is:

1. A substituted vinyl aromatic hydrocarbon homopolymer wherein there are as substituents on the aromatic rings of an unsubstituted homopolymer a total of from 0.1 to 2 acetyl and carboxyl groups per aromatic ring, the carboxyl groups constituting from 10 to 95% of the total of said substituent groups, the unsubstituted vinyl aromatic hydrocarbon homopolymer being selected from the group consisting of homopolymers of styrene, divinyl benzene, alpha-methyl styrene, and aryl mono- and di-substituted derivatives thereof wherein the aryl substituent is an aliphatic hydrocarbon radical containing from 1 to 4 carbon atoms.

2. A substituted vinyl aromatic hydrocarbon homopolymer as in claim 1 wherein the unsubstituted vinyl aromatic hydrocarbon homopolymer is polystyrene.

3. A substituted polystyrene wherein there are as substituents on the aromatic rings of said polystyrene a total of from 1 to 2 acetyl and carboxyl groups per aromatic ring in substantially uniform distribution, the carboxyl groups constituting about 80% of the total of said substituent groups.

4. A process for preparing a substituted vinyl aromatic hydrocarbon homopolymer wherein there are as substituents on the aromatic rings of said homopolymer a total of from 0.1 to 2 acetyl and carboxyl groups per aromatic ring, the carboxyl groups constituting from 10 to 95% of the total of said substituent groups, which comprises oxidizing from 10 to 95% of the acetyl groups of a ring acetylated vinyl aromatic hydrocarbon homopolymer containing from 0.1 to 2 acetyl groups per aromatic ring with an aqueous solution of an alkali metal hypohalite; said ring acetylated vinyl aromatic hydrocarbon homopolymer having been derived from a vinyl aromatic hydrocarbon homopolymer having a Staudinger molecular weight of from about 10,000 to 60,000 and selected from the group consisting of homopolymers of styrene, divinyl benzene, alpha-methyl styrene, and aryl mono- and di-substituted derivatives thereof wherein the aryl substituent is an aliphatic hydrocarbon radical containing from 1 to 4 carbon atoms.

5. A process as in claim 4 wherein the vinyl aromatic hydrocarbon homopolymer from which the ring-acetylated vinyl aromatic hydrocarbon homopolymer is derived is polystyrene.

6. A process as in claim 4 wherein about 80% of the acetyl groups are oxidized to carboxyl groups.

References Cited in the file of this patent

UNITED STATES PATENTS 2,642,398    Butler _____ June 16, 1953

OTHER REFERENCES

Brewster: "Organic Chem.," Prentice-Hall, Inc., N.Y., 1953, 2nd ed., pp. 203–04, 206, 210–11.

Brewster: "Organic Chem.," 2nd ed., p. 659, 1955, Prentice-Hall, Inc., N.Y.

Boundy-Boyer: "Styrene," p. 683, 1957, Reinhold Publ. Corp., N.Y.

Whitmore: "Organic Chem.," p. 681, 1951, D. Van Nostrand Co., Inc., N.Y.